United States Patent
Arjunan et al.

(10) Patent No.: US 11,625,532 B2
(45) Date of Patent: Apr. 11, 2023

(54) DYNAMICALLY GENERATED CONTENT UNDERSTANDING SYSTEM

(71) Applicant: Microsoft Technology Licensing, LLC, Redmond, WA (US)

(72) Inventors: Kumar Rathnam Arjunan, Redmond, WA (US); San Jia Kuang, Woodinville, WA (US); Thottam R. Sriram, Redmond, WA (US); Gang Chen, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 398 days.

(21) Appl. No.: 16/220,217

(22) Filed: Dec. 14, 2018

(65) Prior Publication Data
US 2020/0192977 A1  Jun. 18, 2020

(51) Int. Cl.
*G06F 16/00* (2019.01)
*G06F 40/205* (2020.01)
*G06F 11/30* (2006.01)
*G06F 11/34* (2006.01)
*G06F 16/245* (2019.01)

(52) U.S. Cl.
CPC ........ *G06F 40/205* (2020.01); *G06F 11/3096* (2013.01); *G06F 11/3409* (2013.01); *G06F 16/245* (2019.01)

(58) Field of Classification Search
CPC .................. G06F 40/25; G06F 11/3096; G06F 11/3049
See application file for complete search history.

(56) References Cited

U.S. PATENT DOCUMENTS

| | | | |
|---|---|---|---|
| 6,757,708 B1 | 6/2004 | Craig et al. | |
| 7,870,295 B2 | 1/2011 | Johnson | |
| 8,660,969 B1 | 2/2014 | Hall et al. | |
| 10,050,833 B2 | 8/2018 | Anand et al. | |
| 2002/0141449 A1 | 10/2002 | Johnson | |
| 2006/0212433 A1* | 9/2006 | Stachowiak | G06F 16/3344 |
| 2013/0318107 A1* | 11/2013 | Asaad | G06F 16/24568 |
| | | | 707/755 |
| 2016/0292146 A1 | 10/2016 | Li et al. | |
| 2018/0189299 A1* | 7/2018 | Jaggars | G06F 16/116 |

(Continued)

FOREIGN PATENT DOCUMENTS

CA   2804828 A1   7/2013
WO   2018222324 A1   12/2018

OTHER PUBLICATIONS

"TIKA—Quick Guide", Retrieved <<https://web.archive.org/web/20141107142724/https:/www.tutorialspoint.com/tika/tika_quick_guide.htm>>, Nov. 7, 2014, 70 Pages.

(Continued)

*Primary Examiner* — Paul Kim
(74) *Attorney, Agent, or Firm* — Christopher J. Volkmann; Kelly, Holt & Christenson, PLLC

(57) ABSTRACT

An item of content is received and it is analyzed to identify any different types of parsers that can be used to parse the item of content based on prior, user-selected parsers. One or more parsers is selected, based upon the content type in the item of content and based upon the prior, user-selected parsers. The selected parser is constructed in a server environment and is controlled to parse the item of content.

18 Claims, 7 Drawing Sheets

(56) References Cited

U.S. PATENT DOCUMENTS

2018/0218084 A1* 8/2018 Song .................. G06F 16/9535
2018/0246944 A1   8/2018 Yelisetti et al.

OTHER PUBLICATIONS

Li, et al., "Multi-modal Summarization for Asynchronous Collection of Text, Image", In Proceedings of Conference on Empirical Methods in Natural Language Processing, Sep. 7, 2017, pp. 1092-1102.

Matteson, Andrew, "Inside Google SyntaxNet", Retrieved from: http://andrewmatieson.name/index.php/2017/02/04/inside-syntaxnet/, Feb. 4, 2017, 28 Pages.

Mekuria, et al., "Amharic Text Document Summarization Using Parser", In International Journal of Pure and Applied Mathematics, vol. 118, No. 24, May 26, 2018, pp. 1-15.

"International Search Report and Written Opinion Issued in PCT Application No. PCT/US19/064565", dated Mar. 11, 2020, 13 Pages.

"Office Action Issued in Indian Patent Application No. 202147027005", dated Jan. 6, 2023, 6 Pages.

* cited by examiner

DYNAMICALLY GENERATED CONTENT UNDERSTANDING SYSTEM

BACKGROUND

Computing systems are currently in wide use. Some such computing systems include server-based systems that host or serve content-related functions.

Some of these types of systems handle different types of content for different tenants. By way of example, some such systems can include productivity and electronic mail systems, document management systems, search engine and data mining systems, music and photo cataloging systems, among a wide variety of others. The items of content that are handled and processed by these types of systems can include a wide range of different types of content. For example, they can be text-based documents, images, videos, voice or other sound records, compressed archive files, line-of-business documents (such as quotes, opportunity records, etc.).

In order for search functionality and intelligence functionality to work properly on these items of content, the items of content are often processed by a content understanding system which attempts to generate a summary and annotations. The annotations may include such things as special characteristics or formatting corresponding to the item of content. The operation of generating a summary and annotations corresponding to an item of content is often referred to as "parsing" and this is performed by an item of logic referred to as a "parser".

Some items of content are also referred to as "composite items" or "complex items". In those items of content, there may be multiple different content types within the single item. For instance, a word processing document may include an embedded image. In these cases, there may be times when multiple different parsers are needed to generate an acceptable summary and annotations, corresponding to the item of content.

The discussion above is merely provided for general background information and is not intended to be used as an aid in determining the scope of the claimed subject matter.

SUMMARY

An item of content is received and it is analyzed to identify any different types of parsers that can be used to parse the item of content based on prior, selected parsers. One or more parsers is selected, based upon the content type in the item of content and based upon the prior, user-selected parsers. The selected parser is constructed in a server environment and is controlled to parse the item of content.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
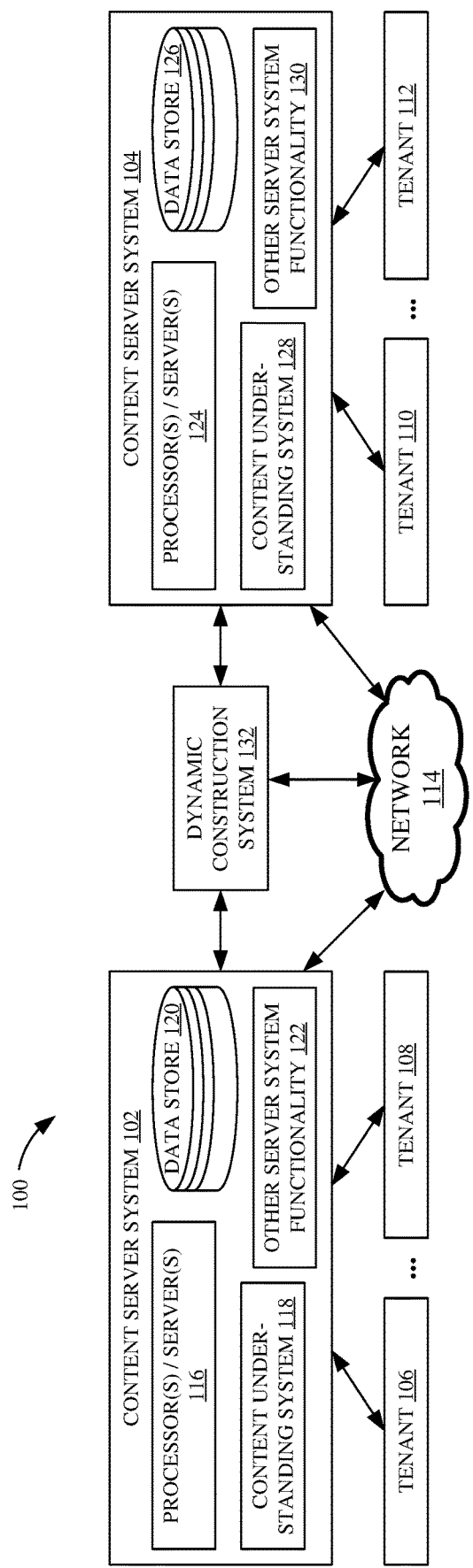
FIG. 1 is a block diagram of one example of a computing system architecture in which one or more content understanding systems process items of content.

FIG. 1 is a block diagram of one example of a computing system architecture 100 which shows a plurality of different content server systems 102-104 each serving multiple tenants 106, 108, 110 and 112. Systems 102 and 104 can be connected to one another (and/or to their corresponding tenants) over network 114. Network 114 can be any of a wide variety of different types of networks, such as a local area network, a wide area network, a cellular communication network, a near field communication network, or any of a variety of other types of networks or combinations of networks.

The content server systems 102-104 can be any of a variety of different types of content server systems, such as electronic mail systems, productivity systems, document sharing and management systems, search systems, data mining systems, line-of-business systems, music and image cataloging systems, or a wide variety of other systems. Content server system 102 is shown having one or more processors or servers 116, content understanding system 118, data store 120, and it can have a wide variety of other system functionality 122. Similarly, content server system 104 is shown with one or more processors or servers 124, data store 126, content understanding system 128, and it can have a wide variety of other server system functionality 130 as well. Content server systems 102-104 may be similar, or different. For the sake of the present discussion, it is assumed that they are similar so that only content server system 102 is described more fully below.

In one example, tenants 106-108 access or interact with documents (or items of content) that are stored and processed by content server system 102. System 102 may serve or host other functionality as well. Items of content accessed or provided by tenants 106-108 are processed by content understanding system 118. Content understanding system 118 illustratively generates a summary and annotations corresponding to each item of content. In doing so, it may operate on a binary representation of the item of content to generate a full text summary, along with annotations that may identify the type of content, its formatting, etc. The parsed item of content (and its corresponding summary and annotations) can be stored in data store 120 so that the item of content can be searched or otherwise intelligently processed by such things as search engines, and/or other data or document processing systems.

The type of parsing functionality that is used by content understanding system 118 will thus vary based upon the types of content items that it is processing. For instance, if it is processing a relatively large number of textual image files (such as word processing documents or PDF files), then it may use a text parser to parse the documents. If, on the other hand, a PDF file is generated by assembling images from a scanner, then it may use optical character recognition parsers to generate the text summary and annotations. If it is processing photographic images, then it may use a different type of parser to generate the text summary and annotations.

The processing performed in executing a parser in content understanding system 118 can involve relatively heavy computational tasks in terms of central processing unit (CPU) usage, memory and/or hard disk usage, etc. Also, depending upon the particular parser capability of content understanding system 118, the time that the parser uses to parse an item of content, as well as the accuracy with which the item is parsed, can vary widely.

In addition, depending upon different scenarios, the performance characteristics of the parser that are desired by the different tenants 106-108 may vary as well. Some tenant computing systems may have requirements with respect to user latency, memory/CPU usage, tenant preference with respect to parser type, or others. The users of tenants 106-108 may also identify preferences for different parser results, parsers, etc.

Therefore, in one example (and as also shown in FIG. 1) dynamic construction system 132 is deployed in architecture 100. Dynamic construction system 132 is shown in FIG. 1 as being separate from both content server system 102 and content server system 104. It can thus be a separately hosted service or system that is accessed by systems 102-104. In another example, dynamic construction system 132 can be located on content server system 102 and accessed by content server system 104, or it can be located on content server system 104 and accessed by content server system 102. In yet another example, a separate dynamic construction system 132 can be located on each of the content server systems 102-104.

Briefly, by way of overview, dynamic construction system 132 illustratively monitors parser usage, tenant user input or feedback, and parser use characteristics relative to different items of content processed by content server system 102 and identifies different parser functionality that should be deployed to content understanding system 118, based upon, among other things, the way tenants 106-108 are using the parsing functionality. Where dynamic construction system 132 also services content serving system 104, it can do the same thing with system 104. It can also pre-deploy parsing functionality to the different systems 102-104 based on current, historic and/or predicted parser usage.

In addition to pre-deploying parser functionality in the different content understanding systems, dynamic construction system 132 can receive a content item to be parsed, and dynamically construct a parser in the corresponding content understanding system 118 where the content item is to be parsed. As is described in greater detail below, dynamic construction system 132 illustratively processes the received content item to identify one or more parsers that may be used to parse the content item. It then generates a parser graph that identifies a sequence of parsers that are to be used (where more than one is to be used, such as in the case of a complex item of content) and constructs or deploys those parsers, in the appropriate sequence, on the corresponding content understanding system 118 where the parsing functionality is to be performed. In doing so, it can consider a wide variety of information such as what content types are contained in the item of content, parsers that are historically used for those content types, parsers that are identified by users, how similar the item of content (where its type is unknown) is to other content items, the feedback from the tenant as to parser preferences, latency or other user defined performance preferences, among a wide variety of other things. In this way, the parsing capabilities can be dynamically constructed, during runtime, when they are not already pre-deployed to a content understanding system. They can be constructed during runtime, considering historical parsing operations and user feedback preferences, in order to provide a highly accurate summary and corresponding annotations.

Figure 2:
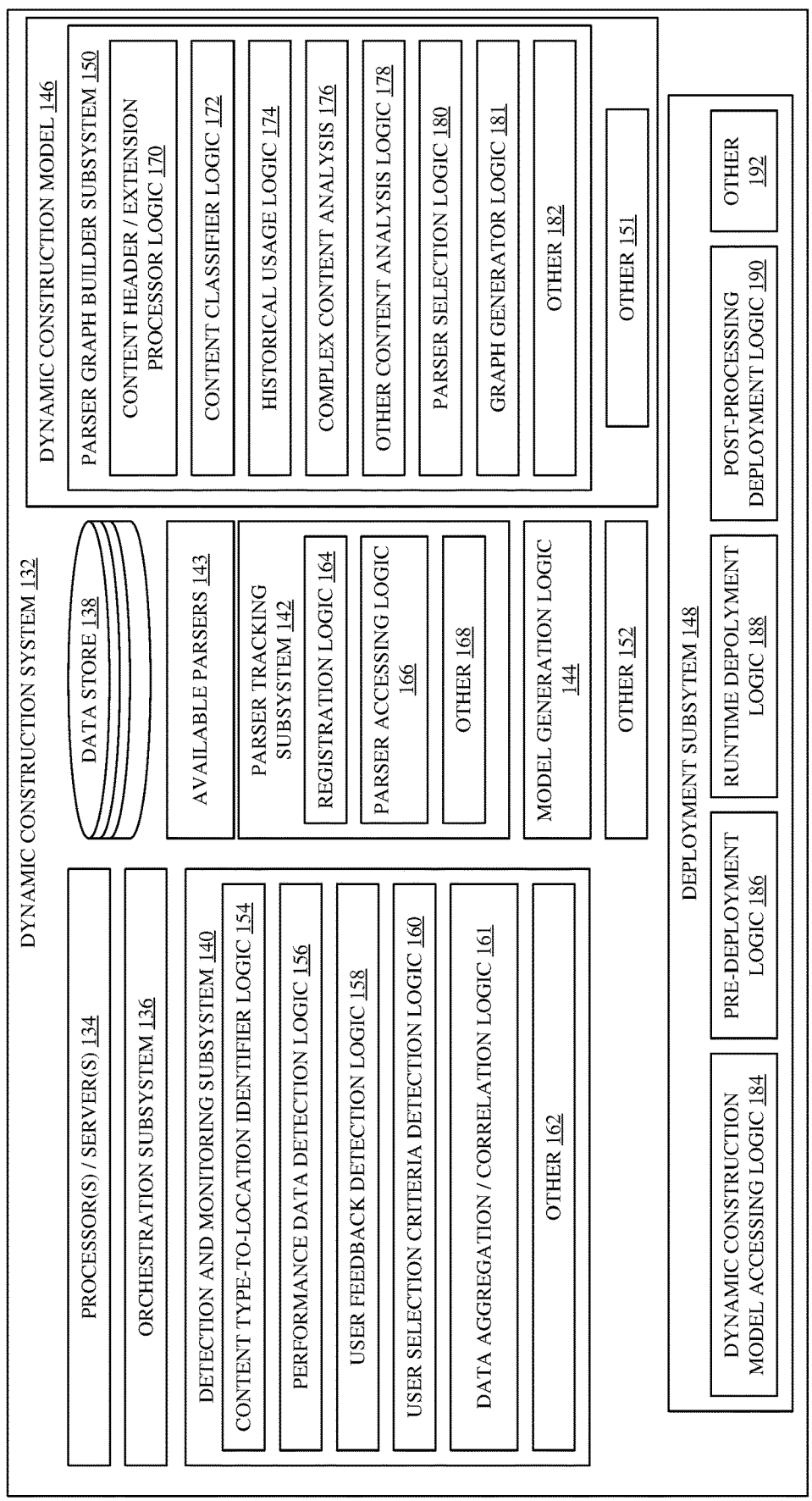
FIG. 2 is a block diagram showing one example of a dynamic construction system.

FIG. 2 is a block diagram showing one example of dynamic construction system 132, in more detail. FIG. 2 shows that, in one example, dynamic construction system 132 illustratively includes one or more processors or servers 134, orchestration subsystem 136, data store 138, detection and monitoring subsystem 140, parser tracking subsystem 142 that tracks available parsers 143, model generation logic 144, dynamic construction model 146 (which can include parser graph builder subsystem 150), deployment subsystem 148, and it can include a wide variety of other items 152. Before describing the overall operation of system 132 in more detail, a brief description of some of the items in system 132, and their operation, will first be provided.

Orchestration system 136 illustratively determines which content understanding system 118-128 will be performing parsing operations on a received item of content. Detection and monitoring subsystem 140 detects a variety of different types of information that can be used by model generation logic 144 to generate a dynamic construction model 146. Dynamic construction model 146 can include subsystem 150 (described below) and illustratively generates an output, based upon a received item of content, or based upon a call for an output, that identifies parsing functionality that should be deployed in certain systems.

Detection and monitoring subsystem 140 can include content type-to-location identifier logic 154, performance data detection logic 156, user feedback detection logic 158, user selection criteria detection logic 160, data aggregation/correlation logic 161, and it can include other items 162. In one example, the various parsers can have reporting logic deployed in them so that they can report back the types of content items they are being called on to parse, the geographic location where they are located, the data center they are located in, the server ID that identifies the server they are running on, the tenant ID that identifies the tenant for which the content item is being parsed, among other things.

Thus, content type-to-location identifier logic 154 identifies the relationship between the type of content that is being parsed, and its location (in terms of its geographic location, data center, server, tenant, etc.). Performance data detection logic 156 detects performance data corresponding to the parsing operations being performed by the different parsers. For instance, it can detect the latency, CPU usage, memory and hard disk usage, among other things, for different parsing operations.

User feedback detection logic 158 illustratively generates a representation of a user interface that can be surfaced for the users of a particular tenant to provide feedback with respect to the parsing operation. They can, for instance, be provided with the result of two different parsers operating on the same content item, and be asked to choose which they prefer. They can be asked to rate their satisfaction with a parser output. They can be asked to select a parser for a particular type of content or they can be asked for feedback in a variety of other ways as well.

User selection criteria detection logic 160 can also illustratively provide a user input mechanism by which a user of a particular tenant can identify selection criteria that he or she wishes to be used in selecting a parser to parse various content items. The selection criteria may allow the user to identify such things as latency, accuracy, performance (e.g., CPU and memory usage), etc. The user may identify which of these criteria are most important so that they can be considered by dynamic construction model 146 in identifying the parsers that are to be deployed and used in the content understanding system that is to parse the item of content.

Data aggregation/correlation logic 161 can aggregate the data received by subsystem 140. It can aggregate it over parsing operations or in other ways. It then illustratively correlates the aggregated data to a parser, location, or in other ways.

Detection and monitoring subsystem 140 can detect and monitor a wide variety of other information that can be used as well. This is indicated by block 162.

Parser tracking subsystem 142 illustratively includes registration logic 164, parser accessing logic 166, and it can include a wide variety of other items 168. Registration logic 164 allows developers to register or otherwise provide an indication that a parser is available for use. It can provide the content type that it parses, and a wide variety of other data that identifies the particular parser. Parser accessing logic 166 illustratively accesses a list of parsers 143 or the identifying data for the available parsers 143 (those that have been identified to registration logic 164) and provides that information to dynamic construction model 146 and parser graph builder subsystem 150.

Model generation logic 144 receives information from detection and monitoring system 140 and other items and, in one example, runs a machine learning system to generate and improve dynamic construction model 146. In another example, dynamic construction model 146 can also be generated based on a set of rules (such as business rules) and a model generation algorithm. Dynamic construction model 146 can be any type of machine generated model that is used to identify parsers that are to be used in different scenarios. Model 146 can generate an output indicating one or more parsers that are to be used during runtime, or it can generate that output to pre-deploy parsing functionality to different locations, before parsing is performed or intermittently during operation of systems 118, 128. In doing so, it can use parser graph builder subsystem 150 and/or other logic 151.

Parser graph builder subsystem 150 illustratively receives information from subsystem 140 or the item of content to be parsed, during runtime, and analyzes that information item of content. Based on the analysis, it accesses the available parsers through parser accessing logic 166 and identifies which particular parsers should be used, and in what sequence they should be used in order to parse the item of content (when it is a complex item of content containing two or more types of content). Thus, subsystem 150 illustratively includes content header/extension processor logic 170, content classifier logic 172, historical usage logic 174, complex content analysis logic 176, other content analysis logic 178, parser selection logic 180, graph generator logic 181, and it can include a wide variety of other items 182. Content header/extension processor logic 172 analyzes the header information and extension information for an item of content in order to identify the type of content that is being processed. Complex content analysis logic 176 identifies whether the item of content is a complex item, meaning that it has more than one type of content in it (for which more than one type of parser may be needed). Examples of this may include a spreadsheet document with an image attached or embedded, a word processing document with an audio file or image embedded, among other things.

When the type of content cannot be identified by logic 170 and 176, content classifier logic 172 analyzes the binary representation of the item of content and classifies it into one of a plurality of different pre-defined categories that correspond to previously parsed items of content. For instance, where it receives an item of content that is unknown, the binary representation of that item of content may have characteristics that closely resemble a word processing document. It may have characteristics that closely resemble an optical image or photograph. It may have characteristics that represent a complex document that includes multiple different types of content. In that case, content classifier logic 172 (which may be a machine learned classifier) classifies the item of content into a pre-defined category. Each pre-defined category may have one or more corresponding parsers corresponding to it so that, once the category is identified, the corresponding parser or set of parsers that will be used to parse the item of content, will be known as well.

Historical usage logic 174 may identify parsers that have been used to parse this type of content in the past. It may identify user-selected parsers or parsers chosen based on user-defined selection criteria or otherwise.

Once the logic has executed on the item of content, then parser selection logic 180 selects one or more parsers, and graph generator logic 181 arranges the selected parsers in a sequence corresponding to a sequence in which the parsers will operate on the item of content. It will be noted that parser selection logic 180 illustratively selects a parser that has been identified as being most suitable for the type of content. For instance, if a type of content is an image, then parser selection logic 180 will ask the processing and analysis logic to identify the type of image (such as whether it is a photograph or an image of a text document (such as a PDF file)). An optical character recognition-based parser may be suitable for an image of a text file, but not suitable for a different type of visual image, such as a photograph. Thus, it will distinguish between the types of image in order to select the parser to be used in parsing the item of content.

The graph output by logic 181 or the selected parsers output by logic 180 can be provided to and used by deployment subsystem 148. Deployment subsystem 148 illustratively includes dynamic construction model accessing logic 184, pre-deployment logic 186, runtime deployment logic 188, post-processing deployment logic 190, and it can include other items 192. Logic 184 illustratively accesses the parsers identified by parser graph builder subsystem 150 to identify parsers that should be deployed to different content understanding systems 118-128. This can be done prior to receiving an item to be parsed, or at runtime. For instance, it may identify that a particular tenant is exhibiting a particularly heavy usage of a certain type of parser functionality. It may also be that, currently, that parser functionality is not located in a geographic location, or on a data center, that is close to the tenant that is using the functionality. In such a scenario, pre-deployment logic 186 can deploy the identified parser capability (or parser 143) to a data center or geographic location close to that tenant, in order to reduce latency for that tenant. Pre-deployment logic 186 can deploy parser functionality to accommodate workloads in different server environments, or for other reasons as well, as output by dynamic construction model 146.

Runtime deployment logic 188 can also use the output from dynamic construction model 146 (e.g., the graph output by graph generator logic 188) to perform a runtime deployment of parsers to a content understanding system 118-128, based upon a content item that has been received and that is to be subjected to parsing. Post-processing deployment logic 190 can construct post-processing logic at the content understanding system 118-128 as well, based upon the particular needs of a tenant, based upon a user selected parser or user defined selection criteria, based upon historically observed processing, or for other reasons.

Figure 3:
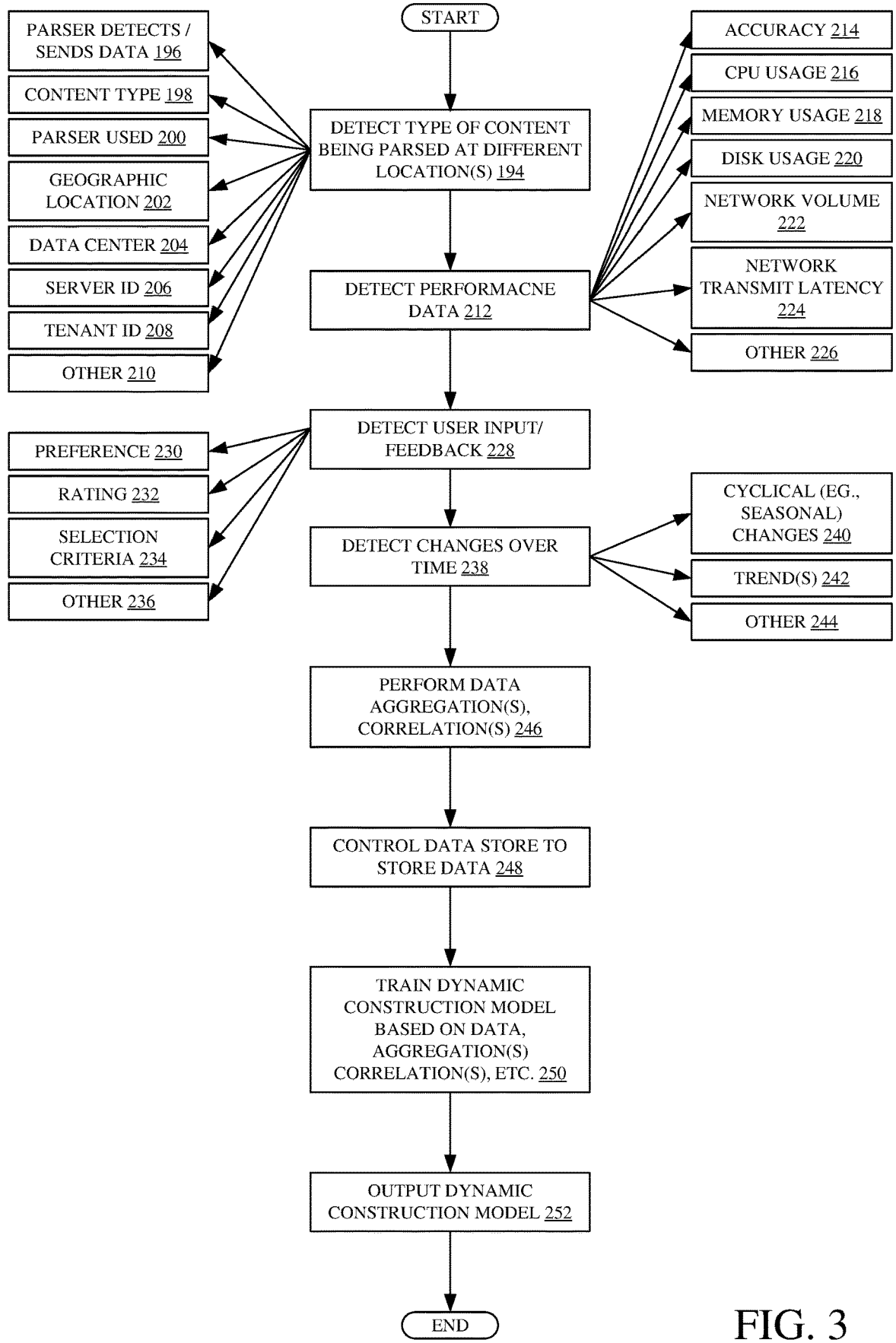
FIG. 3 is a flow diagram illustrating one example of the operation of a detection and monitoring subsystem that is used to train a dynamic construction model.

FIG. 3 is a flow diagram illustrating one example of the operation of detection and monitoring subsystem 140 in detecting and monitoring information that can be used by model generation logic 144, parser graph builder subsystem 150 and/or deployment subsystem 148.

Detection and monitoring subsystem 140 detects the type of content that is being parsed at the different locations. This is indicated by block 194 in the flow diagram of FIG. 3. In one example, the parsers in the content understanding systems 118, 128 detect and send an indication of the type of data that they are being asked to parse. This is indicated by block 196. That data can identify the type of content 198, the particular parser used, as indicated by block 200, the geographic location where the parsing is being performed, as indicated by block 202, an identity of the data center where it is performed, as indicated by block 204, a server identifier identifying a server that performs the parsing, as indicated by block 206, a tenant identifier that identifies the tenant for which the parsing is performed, as indicated by block 208, and it can include a wide variety of other items as well. This is indicated by block 210.

Performance data detector logic 156 then detects performance data for the various parsing operations. This is indicated by block 212. The performance data can include an indication of parsing accuracy, as indicated by block 214. It can include indicators of CPU usage 216, memory usage 218, disk usage 220, network volume 222, network transmission latency 224, and it can include a wide variety of other items 226.

User feedback detection logic 158 can detect any user feedback 228 that is provided. This can include preference data which indicates a user preference for a parser, over other parsers, the preference data is indicated by block 230. It can include a user rating that rates the user's satisfaction with a parsing result or with the operation of a particular parser, as indicated by block 232. User selection criteria detection logic 160 can detect selection criteria that are input by the user and which are to be used to select a particular parser. The selection criteria may include performance data, or other items. The selection criteria are indicated by block 234. The user feedback can include a wide variety of other items as well, and this is indicated by block 236.

Detection and monitoring subsystem 140 illustratively detects changes in the data over time. This is indicated by block 238. For instance, it can detect cyclical or periodic change, such as that a particular tenant processes a particular type of content more heavily at different times during the day, during the year, etc. This is indicated by block 240. It can detect trends which indicate such things as the type of content being more frequently processed by different tenants over time, the accuracy or performance of parsers, as they change over time, or a wide variety of other trends. Detecting trends over time is indicated by block 242. The system 140 can detect changes over time in a wide variety of other ways as well, and this is indicated by block 244.

Data aggregation and correlation logic 161 can then perform data aggregations and correlations on the data, and control data store 138 to store the data, the aggregations and correlations, and other related information. The data can be aggregated over time, over parsing operations, or it can be combined in other ways. It can be correlated to parsers, locations, users, etc. Performing the data aggregations and correlations is indicated by block 246, and controlling data store 138 to store that data is indicated by block 248.

Model generation logic 144 then uses a machine learning algorithm to access the data stored in data store 138 and train the dynamic construction model 146 based upon the data, the aggregations, the correlations, etc. This is indicated by block 250. It then outputs the dynamic construction model 246, as indicated by block 252 in the flow diagram of FIG. 3. In this way dynamic construction model uses machine learning to identify parsing capabilities that should be pre-deployed to different environments (such as to the different server systems shown in FIG. 1). It can also receive a document to be identified (or analysis results of that content item) and generate an output to deployment system 148 indicating which parsers should be deployed, to which locations, for parsing that item of content.

Figure 4A:
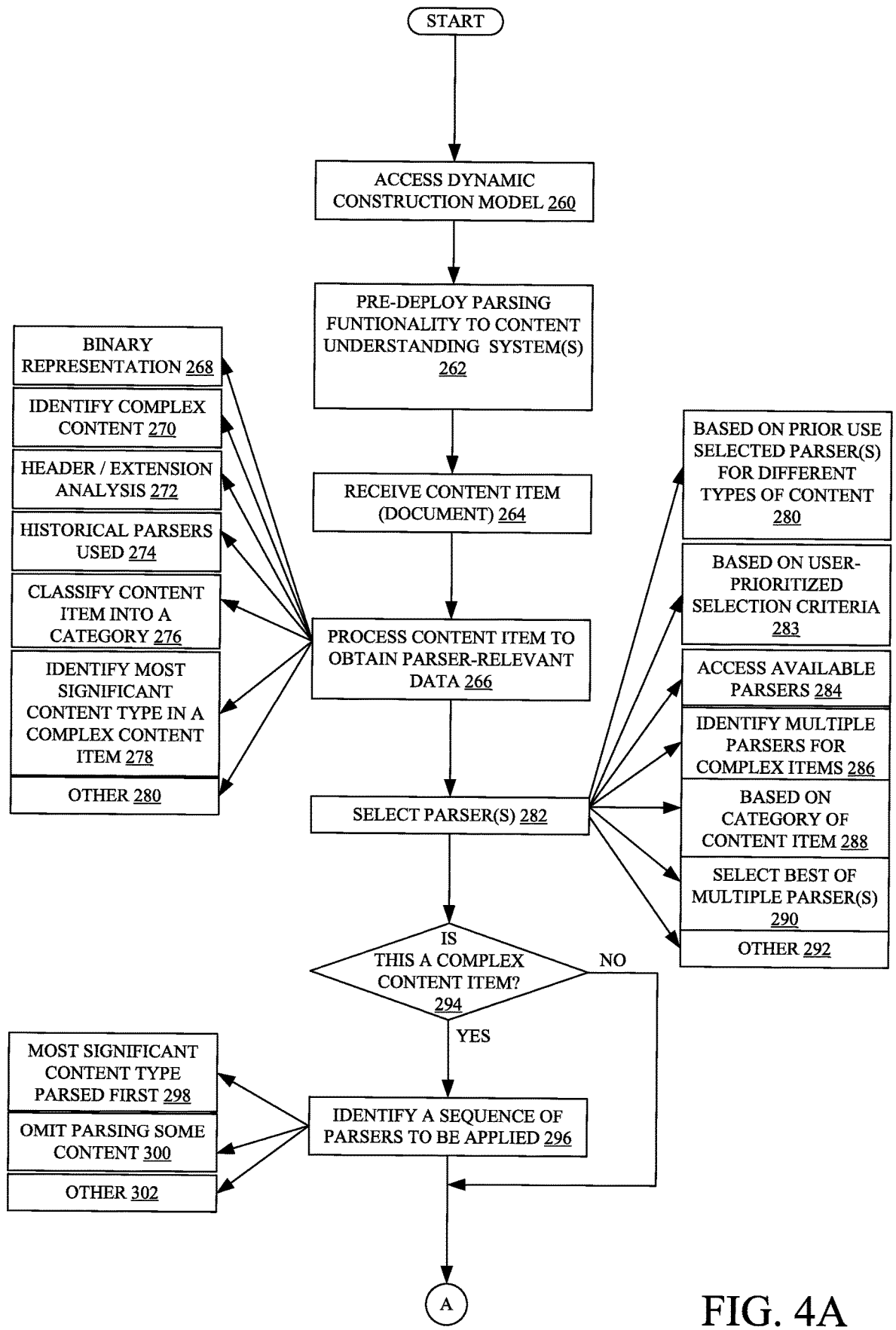
FIGS. 4A and 4B (collectively referred to herein as FIG. 4) illustrate a flow diagram showing one example of the operation of the dynamic construction system shown in FIG. 2 in dynamically constructing a content understanding system to parse a received item of content.
Figure 4B:
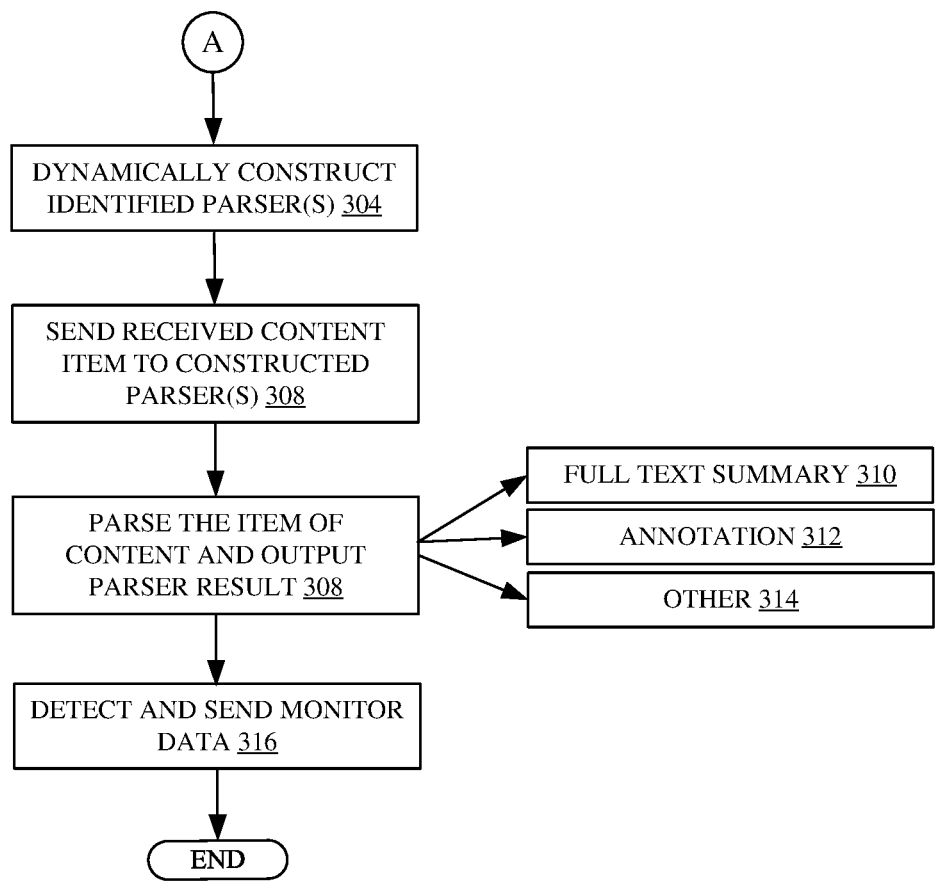

FIGS. 4A and 4B (collectively referred to herein as FIG. 4) show a flow diagram illustrating one example of the operation of dynamic construction system 132 in dynamically constructing parsers or parsing capabilities at a particular location. It is first assumed that dynamic construction model accessing logic 184 accesses dynamic construction model 146 and pre-deployment logic 186 uses model 146 to perform pre-deployment of certain parsing capabilities (or parsers) to different content understanding systems in architecture 100. This can be based upon the historical usage of parsers, the types of content that are being used most often by various tenants, user inputs such as parser selection and selection criteria inputs, among other things. Accessing the dynamic construction model to perform pre-deployment is indicated by block 260 in the flow diagram of FIG. 4, and using pre-deployment logic 186 to pre-deploy parsing functionality to content understanding systems in architecture 100, based upon the output of model 146, is indicated by block 262.

At some point, orchestration subsystem 126 will receive a content item to be parsed. It will identify the particular content understanding system which will be used to parses it. It will also provide the content item to dynamic construction model 146. Receiving the content item to be parsed is indicated by block 264. Model 146 then identifies one or more parsers to use to parse the item of content. In doing so, parser graph builder subsystem 150 processes the content item to obtain parser-relevant data, that will be used to select the one or more parsers that will be used to parse the content item. This is indicated by block 266. It can operate on a binary representation of the content item. That information may indicate the types of content that are in the item. This is indicated by block 268. Complex content analysis logic 176 can identify whether the item of content is a complex content item (meaning that it includes more than one type of content to be parsed). This is indicated by block 270. Content header/extension processor logic 170 illustratively analyzes the header and extension information on the content item. That information may indicate the types of content that are in the item. This is indicated by block 272. Historical usage logic 174 identifies parsers that have been historically used to parse this type of content. This is indicated by block 274. Content classifier logic 172 can classify the item of content (such as when it cannot be determined by the other analysis) into one of a plurality of pre-defined categories based upon the characteristics of the binary representation of the item of content. This is indicated by block 276.

The content can be processed in a variety of other ways as well. For instance, other content analysis logic 178 may identify the most significant content type, in a complex content item, that is to be parsed. By way of example, if the item of content is a spreadsheet, but it has a single image attached to it, it may be that the spreadsheet is the most significant content type and it may be labeled as such. Identifying the most significant content type in a complex content item is indicated by block 278 in the flow diagram of FIG. 4. The content item can be processed in a wide variety of other ways to identify parser-relevant data, and this is indicated by block 280.

Parser selection logic 180 then identifies or selects one or more parsers to be used in parsing the document. Selecting the parsers is indicated by block 282. It can select the parsers based on prior user-selected parsers, that were selected for different types of content. This is indicated by block 281. It can make the selection based on use-prioritized selection criteria. For instance, the user may indicate that speed is higher priority than CPU usage. This is just one example and it is indicated by block 283. It can use parser accessing logic 166 to access the parsers that are available. This is indicated by block 284. It identifies multiple parsers for a complex item as indicated by block 286. It can identify the parser based upon the category into which the item of content was categorized by classifier logic 172. This is indicated by block 288. It can select a best parser where multiple parsers are possible. Where multiple parsers are available to parse an object file, then the particular content of the object file may be identified in order to select a best parser. This is indicated by block 290. The parsers can be selected in a wide variety of other ways as well, and this is indicated by block 292.

Once parser selection logic 180 has selected a set of parsers, then graph generator logic 181 identifies a sequence in which the parsers are to operate on the complex content item. Identifying whether more than one parser has been selected is indicated by block 294, and identifying a sequence of parsers to be applied is indicated by block 296. In one example, the sequence of parsers will be arranged so that the most significant content type is parsed first. This is indicated by block 298. Also, for reasons of latency, performance, or other reasons, it may be that some content is not parsed. By way of example, it may be that only the most significant content type is parsed, and the summary and annotations are generated based upon that content type, while the remaining content type is unparsed for this item of content. Omitting parsing of some content is indicated by block 300 in the flow diagram of FIG. 4. Identifying the sequence of parsers to be applied can be done in other ways as well, and this is indicated by block 302.

Runtime deployment logic 188 then dynamically constructs the identified parsers (identified by graph generator logic 181) in the environment where they are to be constructed. This is indicated by block 304 in the flow diagram of FIG. 4. For instance, if orchestration subsystem 136 has identified that content understanding system 118 is to perform the parsing, and dynamic construction model 146 and/or subsystem 150 have identified a set of parsers that are to be used for that parsing, then runtime deployment logic 188 deploys those parsers to (or constructs them on) content understanding system 118.

Orchestration subsystem 136 then forwards the received item of content to the constructed parsers to have it parsed. The parsers then output the parsed result. Sending the received item of content to the environment where it is to be parsed is indicated by block 306, and parsing the item of content and outputting the parser results is indicated by block 308. In one example the parser result includes a full text summary 310, a set of annotations 312 (some of examples of which were described above) and it can include a wide variety of other things 314.

The parser that is running, or has just run, then detects and sends the monitor data, that is monitored by subsystem 140, to subsystem 140. This is indicated by block 316.

It can thus be seen that parsing functionality can be pre-deployed based upon a machine learned model output that considers historic parsing operations, parsing selection criteria, user selected parsers or selection criteria, latency information, performance information, and a wide variety of other information in pre-deploying parsing capabilities to different environments or server systems. Also, during runtime, particular parsers are selected and used to parse content items, in a dynamic fashion so that the desired parsing functionality is deployed, during runtime, to perform efficient parsing of a wide variety of different types of content items.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 5:
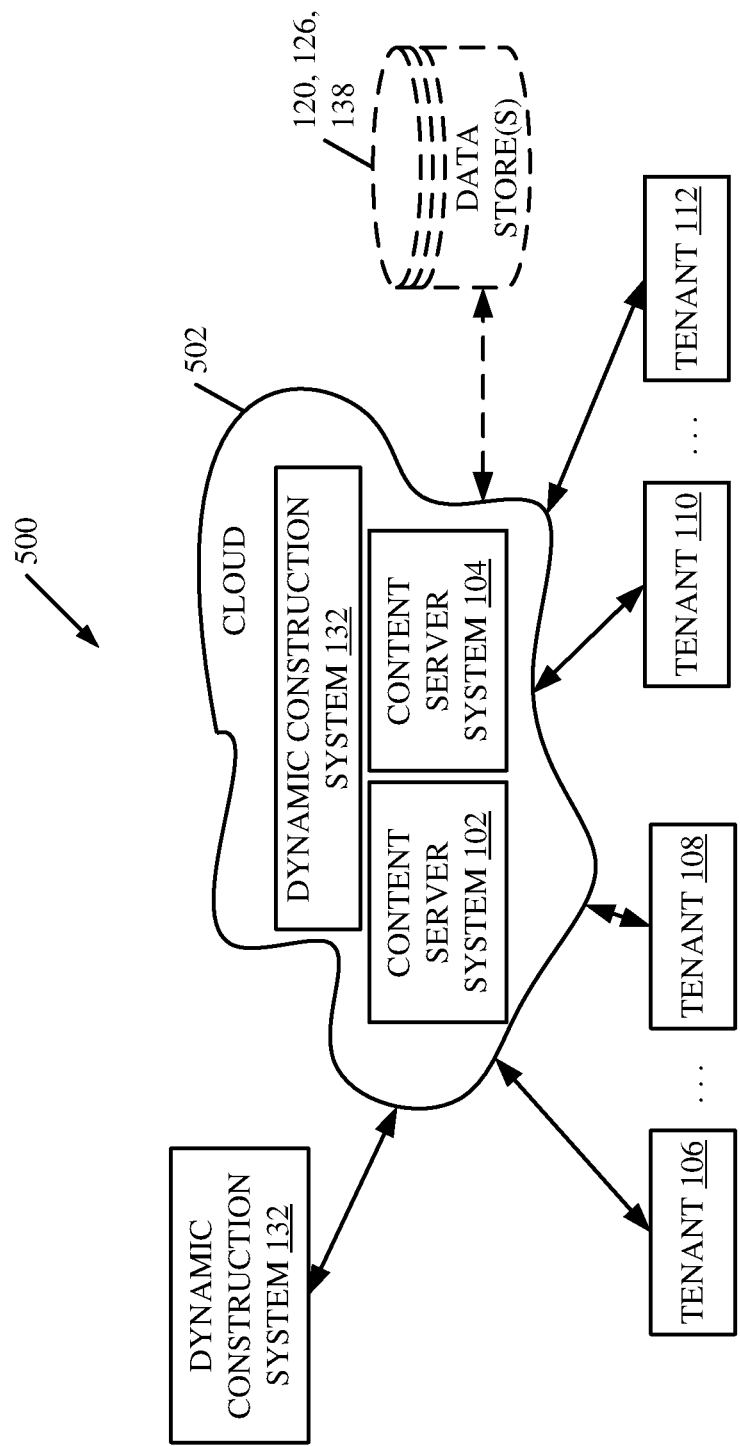
FIG. 5 is a block diagram showing one example of the architecture illustrated in FIG. 1, deployed in a cloud computing architecture.

FIG. 5 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 5, some items are similar to those shown in FIG. 1 and they are similarly numbered. FIG. 5 specifically shows that systems 102, 104 and 132 can be located in cloud 502 (which can be public, private, or a combination where portions are public while others are private). Therefore, tenants 106, 108, 110, 112 use user devices to access those systems through cloud 502.

FIG. 5 also depicts another example of a cloud architecture. FIG. 5 shows that it is also contemplated that some elements of architecture 100 can be disposed in cloud 502 while others are not. By way of example, data stores 120, 126, 138 can be disposed outside of cloud 502, and accessed through cloud 502. In another example, dynamic construction system 132 (or other items) can be outside of cloud 502. Regardless of where they are located, they can be accessed directly by tenants 106, 108, 110, 112 or systems 102, 104, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
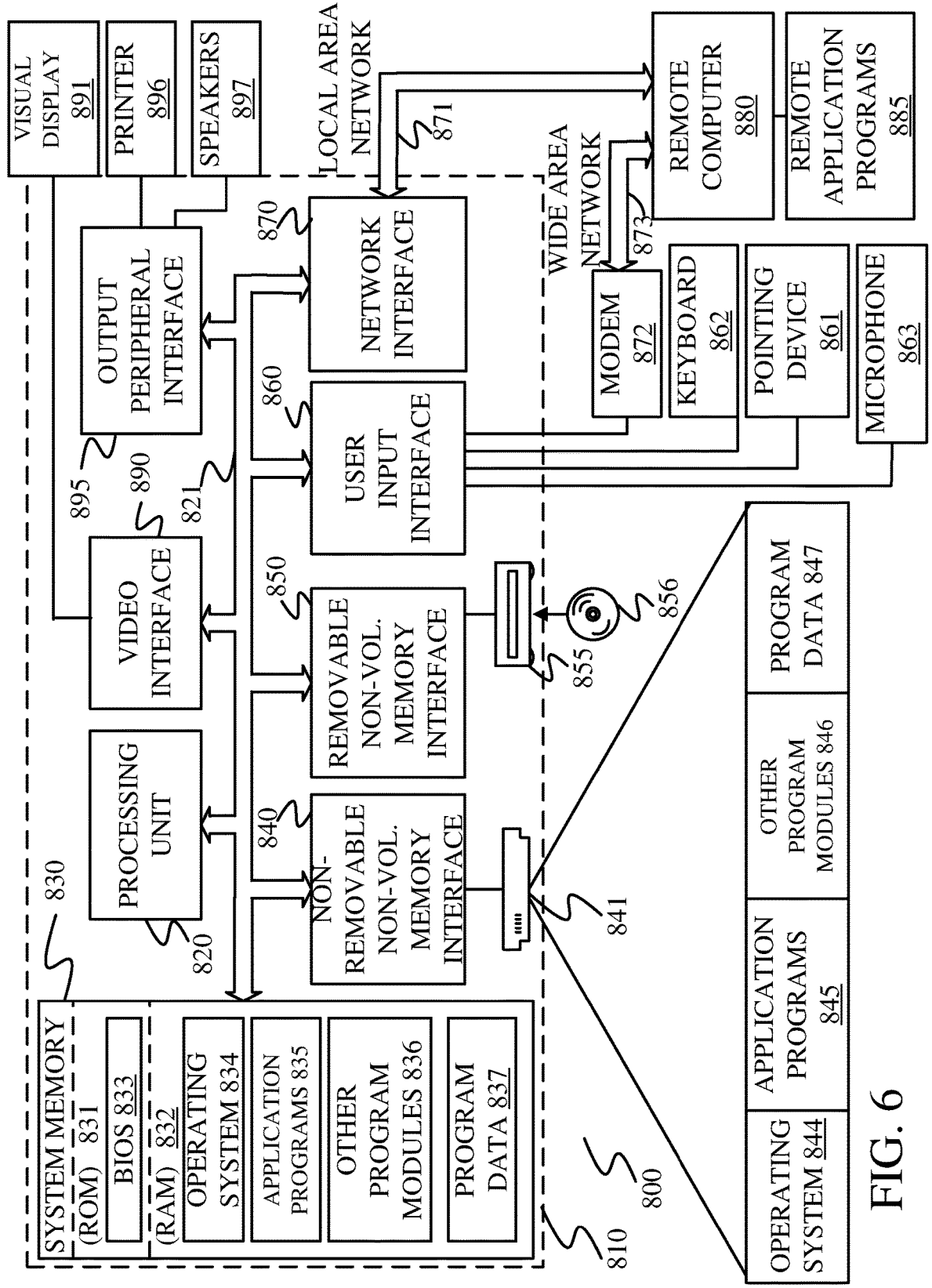
FIG. 6 is a block diagram showing one example of a computing environment that can be used in the architectures shown in the previous figures.

FIG. 6 is one example of a computing environment in which architecture 100, or parts of it, (for example) can be deployed. With reference to FIG. 6, an example system for implementing some embodiments includes a general-purpose computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 6.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 6 illustrates operating system 834, application programs 835, other program modules 836, and program data 837.

The computer 810 may also include other removable/non-removable volatile/nonvolatile computer storage media. By way of example only, FIG. 6 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 6, provide storage of computer readable instructions, data structures, program modules and other data for the computer 810. In FIG. 6, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 6 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 6 illustrates remote application programs 885 as residing on remote computer 880. It will be appreciated that the network connections shown are exemplary and other means of establishing a communications link between the computers may be used.

It should also be noted that the different examples described herein can be combined in different ways. That is, parts of one or more examples can be combined with parts of one or more other examples. All of this is contemplated herein.

Example 1 is a computing system, comprising:

detection and monitoring logic that detects parser-related data from a content understanding system that parses content items to generate a textual summary of each of the content items, the parser-related data being indicative of a type of content parsed by the content understanding system and a parser identifier indicative of a user-selected parser used to parse the content items;

a parser tracking subsystem that identifies available parsers;

parser selection logic that receives an item of content to be parsed, accesses the parser tracking system and automatically selects a parser, of the available parsers, to parse the item of content to be parsed based on the parser identifier; and a deployment subsystem that generates a control signal to deploy the selected parser.

Example 2 is the computing system of any or all previous examples and further comprising:

user selection criteria detection logic configured to detect a priority input indicative of prioritized selection criteria, the parser selection logic being configured to select the parser based on the prioritized selection criteria.

Example 3 is the computing system of any or all previous examples wherein the detection and monitoring logic comprises:

user feedback detection logic configured to detect a separate parser identifier for each of a plurality of different corresponding content types, each separate parser identifier identifying a user-selected parser to parse the corresponding content type.

Example 4 is the computing system of any or all previous examples wherein the received item of content to be parsed comprises a complex item of content having a plurality of different content types, and wherein the parser selection logic selects a plurality of different parsers, based on the parser identifiers corresponding to the plurality of different content types.

Example 5 is the computing system of any or all previous examples wherein the parser selection logic selects the plurality of different parsers, based on the prioritized selection criteria.

Example 6 is the computing system of any or all previous examples and further comprising:

content classifier logic configured to classify the item of content to be parsed into a predefined content type category, based on characteristics of the item of content to be parsed, each predefined category having a corresponding parser identifier.

Example 7 is the computing system of any or all previous examples wherein the parser selection logic is configured to select the parser based on the parser identifier corresponding to the predefined category, into which the item of content to be parsed is classified, by the content classifier logic.

Example 8 is the computing system of any or all previous examples wherein the detection and monitoring logic comprises:

performance data detection logic configured to detect parser performance data indicative of parser latency and resource usage.

Example 9 is the computing system of any or all previous examples and further comprising:

model generation logic configured to generate a dynamic construction model based on the parser-related data and based on the parser performance data, the dynamic construction model being configured to output a parser deployment signal indicative of a model-identified parser to be deployed to a location.

Example 10 is the computing system of any or all previous examples and further comprising:

pre-deployment logic configured to deploy the model-identified parser to the location.

Example 11 is a computer implemented method, comprising:

detecting parser-related data from a content understanding system that parses content items to generate a textual summary of each of the content items, the parser-related data being indicative of a type of content parsed by the content understanding system and a parser identifier indicative of a user-selected parser used to parse the type of content;

receiving an item of content to be parsed;

accessing a set of available parsers;

automatically selecting a parser, of the available parsers, to parse the item of content to be parsed based on the parser identifier; and generating a control signal to deploy the selected parser to parse the received item of content to be parsed.

Example 12 is the computer implemented method of any or all previous examples and further comprising:

detecting a priority input indicative of user-prioritized selection criteria, wherein automatically selecting the parser comprises selecting the parser based on the prioritized selection criteria.

Example 13 is the computer implemented method of any or all previous examples wherein detecting parser-related data comprises:

detecting a separate parser identifier for each of a plurality of different corresponding content types, each separate parser identifier identifying a user-selected parser to parse the corresponding content type.

Example 14 is the computer implemented method of any or all previous examples wherein the received item of content to be parsed comprises a complex item of content having a plurality of different content types, and wherein automatically selecting a parser comprises:

selecting a plurality of different parsers, based on the parser identifiers corresponding to the plurality of different content types.

Example 15 is the computer implemented method of any or all previous examples wherein automatically selecting the parser comprises:

selecting the plurality of different parsers, based on the prioritized selection criteria.

Example 16 is the computer implemented method of any or all previous examples and further comprising:

classifying the item of content to be parsed into a predefined content type category, based on characteristics of the item of content to be parsed, each predefined category having a corresponding parser identifier.

Example 17 is the computer implemented method of any or all previous examples wherein automatically selecting the parser comprises selecting the parser based on the parser identifier corresponding to the predefined category, into which the item of content to be parsed is classified, by the content classifier logic.

Example 18 is the computer implemented method of any or all previous examples wherein detecting parser-related data comprises:

detecting parser performance data indicative of parser latency and resource usage.

Example 19 is the computer implemented method of any or all previous examples and further comprising:

generating a dynamic construction model based on the parser-related data and based on the parser performance data, the dynamic construction model being configured to output a parser deployment signal indicative of a model-identified parser to be deployed to a location; and deploying the model-identified parser to the location.

Example 20 is a computing system, comprising:

detection and monitoring logic that detects parser-related data from a content understanding system that parses content items to generate a textual summary of each of the content items, the parser-related data being indicative of a type of content parsed by the content understanding system and a parser identifier indicative of a user-selected parser used to parse the content items;

a parser tracking subsystem that identifies available parsers;

content classifier logic configured to classify the item of content to be parsed into a predefined content type category, based on characteristics of the item of content to be parsed, each predefined category having a corresponding parser identifier;

user selection criteria detection logic configured to detect a priority input indicative of prioritized selection criteria;

parser selection logic that receives an item of content to be parsed, accesses the parser tracking system and automatically selects a parser, of the available parsers, to parse the item of content to be parsed based on the parser identifier, based on the predefined category and based on the prioritized selection criteria; and a deployment subsystem that generates a control signal to deploy the selected parser.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
at least one processor; and
memory storing instructions executable by the at least one processor, wherein the instructions, when executed, cause the computing system to:
receive historical parser-related data representing a prior parsing of a plurality of content items by a set of available parsers, wherein a first content item of the plurality of content items has a textual summary generated by a content understanding system based on the prior parsing of the first content item, wherein the historical parser-related data comprises:
- a content type identifier indicative of a content type of the first content item parsed by the content understanding system; and
- a parser identifier indicative of a user-selected parser used to parse the first content item;

identify the set of available parsers based on the historical parser-related data;

for each parser in the set of available parsers, detect parser performance data indicative of parser latency and resource usage corresponding to the prior parsing of the plurality of content items;

receive an indication of a second content item to be parsed by the content understanding system;

based on the content type identifier, the parser identifier, and the detected parser performance data, automatically select a parser, of the set of available parsers, configured to parse the second content item; and generate a control instruction that controls the content understanding system to parse the second content item using the selected parser.

2. The computing system of claim 1 wherein the instructions cause the computing system to:
detect a priority input indicative of prioritized selection criteria; and
select the parser based on the prioritized selection criteria.

3. The computing system of claim 2 wherein the instructions cause the computing system to:
detect a separate parser identifier for each of a plurality of different corresponding content types, each separate parser identifier identifying a user-selected parser from a prior parsing of the corresponding content type.

4. The computing system of claim 3 wherein the second content item to be parsed comprises a complex item of content having a plurality of different content types, and wherein the instructions cause the computing system to select a plurality of different parsers, based on the prioritized selection criteria and the parser identifiers corresponding to the plurality of different content types.

5. The computing system of claim 1 wherein the second content item
comprises content other than the first content item previously parsed by the content understanding system, and
is received by the computing system after the historical parser-related data is received from the content understanding system, and
the instructions cause the computing system to:
classify the second content item to be parsed into a predefined content type category based on a characteristic of the second content item to be parsed, the predefined content type category having a corresponding parser identifier; and
select the parser based on the parser identifier corresponding to the predefined content type category.

6. The computing system of claim 1 wherein the instructions cause the computing system to:
receive an indication of a parser performance preference for the parsing of the second content item; and
automatically select the parser, from the set of available parsers, based on correlating the parser performance preference to the detected parser performance data.

7. The computing system of claim 1 wherein the instructions cause the computing system to:
generate a dynamic construction model based on the historical parser-related data and based on the parser performance data, the dynamic construction model being configured to output a parser deployment signal indicative of the selected parser and a selected location to deploy the selected parser; and
deploy the selected parser based on the parser deployment signal.

8. The computing system of claim 7 wherein the historical parser-related data includes location data indicative of a given location at which the user-selected parser was deployed to parse the first content item, and the instructions cause the computing system to:
select the location to deploy the selected parser based on the given location at which the user-selected parser was deployed to parse the first content item; and
pre-deploy the selected parser to the selected location prior to receiving the indication of the second content item.

9. The computing system of claim 8, wherein the location data indicates one or more of a geographic location corresponding to the user-selected parser, a data center corresponding to the user-selected parser, or a tenant identifier associated with the first content item.

10. A computer implemented method, comprising:
receiving historical parser-related usage data representing prior parsing of a plurality of content items by a set of available parsers, wherein a first content item of the plurality of content items has a textual summary generated by a content understanding system based on the prior parsing of the first content item, and the historical parser-related usage data comprises:
a content type identifier indicative of a content type of the first content item parsed by the content understanding system, and
a parser identifier indicative of a user-selected parser used to parse the first content item;
identify the set of available parsers based on the historical parser-related data;
for each parser in the set of parsers, detecting parser performance data indicative of parser latency and resource usage corresponding to the prior parsing of the plurality of content items;
receiving an indication of a second content item to be parsed;
based on the content type identifier, the parser identifier, and the detected parser performance data, automatically selecting a parser, of the set of available parsers, to parse the second content item; and
generating a control instruction that controls the content understanding system to parse the second content item using the selected parser.

11. The computer implemented method of claim 10 and further comprising:
detecting a priority input indicative of user-prioritized selection criteria, wherein automatically selecting the parser comprises selecting the parser based on the prioritized selection criteria.

12. The computer implemented method of claim 11 wherein detecting parser-related data comprises:
detecting a separate parser identifier for each of a plurality of different corresponding content types, each separate parser identifier identifying a user-selected parser from a prior parsing of the corresponding content type.

13. The computer implemented method of claim 12 wherein the second content item to be parsed comprises a complex item of content having a plurality of different content types, and wherein automatically selecting a parser comprises:
 selecting a plurality of different parsers, based on the prioritized selection criteria and the parser identifiers corresponding to the plurality of different content types.

14. The computer implemented method of claim 11, wherein the user-prioritized selection criteria prioritizes parser performance characteristic categories.

15. The computer implemented method of claim 10 and further comprising:
 classifying the second content item into a predefined content type category, based on characteristics of the second content item, each predefined category having a corresponding parser identifier, wherein automatically selecting the parser comprises selecting the parser based on the parser identifier corresponding to the predefined category, into which the second content item is classified.

16. The computer implemented method of claim 10, and further comprising generating a textual summary of the second content item based on the parsing of the second content item.

17. The computer implemented method of claim 10 and further comprising:
 generating a dynamic construction model based on the parser-related data and based on the parser performance data, the dynamic construction model being configured to output a parser deployment signal indicative of a model-identified parser to be deployed to a location; and
 deploying the model-identified parser to the location.

18. A computing system, comprising:
 at least one processor; and
 memory storing instructions executable by the at least one processor, wherein the instructions, when executed, provide:
  detection and monitoring logic configured to:
   detect historical parser-related data representing prior parsing of a plurality of content items by a set of parsers, wherein a content understanding system is configured to generate a textual summary of each of the content items based on the prior parsing, and
   the historical parser-related data comprises:
    a content type identifier indicative of a content type of the set of content items parsed by the content understanding system, and
    a parser identifier indicative of a user-selected parser used to parse the set of content items; and
   for each parser in the set of parsers, detect parser performance data indicative of parser latency and resource usage corresponding to the prior parsing of the plurality of content items;
  a parser tracking subsystem configured to identify available parsers;
  content classifier logic configured to classify a particular item of content to be parsed into a predefined content type category based on characteristics of the particular item of content to be parsed, the predefined content type category having a corresponding parser identifier;
  user selection criteria detection logic configured to detect a priority input from a user indicative of prioritized selection criteria;
  parser selection logic configured to automatically select a parser, of the set of parsers, to parse the particular item of content to be parsed based on:
   the parser identifier,
   the predefined content type category,
   the prioritized selection criteria, and
   the detected parser performance data; and
  a deployment subsystem configured to generate a control signal that controls the selected parser to parse the particular item of content.

* * * * *